(12) United States Patent
Larson et al.

(10) Patent No.: US 9,416,217 B2
(45) Date of Patent: Aug. 16, 2016

(54) PRECURSOR FORMULATIONS FOR A LINER, A ROCKET MOTOR INCLUDING THE LINER, AND RELATED METHODS

(71) Applicant: Orbital ATK, Inc., Dulles, VA (US)

(72) Inventors: Robert S. Larson, North Ogden, UT (US); Elizabeth K. Bonderson, Pleasant View, UT (US)

(73) Assignee: Orbital ATK, Inc., Plymouth, MN (US)

( * ) Notice: Subject to any disclaimer, the term of this patent is extended or adjusted under 35 U.S.C. 154(b) by 657 days.

(21) Appl. No.: 13/796,685

(22) Filed: Mar. 12, 2013

(65) Prior Publication Data
US 2014/0260184 A1    Sep. 18, 2014

(51) Int. Cl.
| | |
|---|---|
| *C08G 65/32* | (2006.01) |
| *C08G 18/79* | (2006.01) |
| *F02K 9/34* | (2006.01) |
| *C08G 18/48* | (2006.01) |
| *C08G 18/69* | (2006.01) |
| *C08G 18/72* | (2006.01) |
| *C08G 18/75* | (2006.01) |
| *C08G 18/76* | (2006.01) |
| *C08K 5/103* | (2006.01) |
| *C08K 7/20* | (2006.01) |
| *C06B 45/12* | (2006.01) |
| *C08G 71/02* | (2006.01) |
| *C08K 3/22* | (2006.01) |
| *C08K 3/38* | (2006.01) |

(52) U.S. Cl.
CPC .............. *C08G 18/792* (2013.01); *C06B 45/12* (2013.01); *C08G 18/4829* (2013.01); *C08G 18/69* (2013.01); *C08G 18/724* (2013.01); *C08G 18/725* (2013.01); *C08G 18/758* (2013.01); *C08G 18/7621* (2013.01); *C08G 18/7657* (2013.01); *C08G 18/7664* (2013.01); *C08G 18/794* (2013.01); *C08K 3/22* (2013.01); *C08K 3/38* (2013.01); *C08K 5/103* (2013.01); *C08K 7/20* (2013.01); *F02K 9/346* (2013.01); *C08K 2003/2227* (2013.01); *C08K 2003/387* (2013.01)

(58) Field of Classification Search
CPC ................................. C08L 71/02; C08L 71/03
USPC .............. 149/19.1, 19.4, 19.6, 19.9; 525/187, 525/403
See application file for complete search history.

(56) References Cited

U.S. PATENT DOCUMENTS

| | | | |
|---|---|---|---|
| 5,209,876 A | 5/1993 | Sayles | |
| 5,273,785 A | 12/1993 | Sinclair et al. | |
| 5,377,593 A | 1/1995 | Boothe et al. | |
| 5,767,221 A | 6/1998 | Poulter et al. | |
| 5,985,361 A | 11/1999 | Poulter et al. | |
| 6,036,894 A * | 3/2000 | Brown | C06B 21/0025 149/19.4 |
| 6,054,521 A | 4/2000 | Nelson et al. | |
| 6,238,499 B1 * | 5/2001 | Jones | C06B 21/0091 149/19.1 |
| 6,606,852 B1 | 8/2003 | Harvey et al. | |
| 6,632,378 B1 | 10/2003 | Wallace, II et al. | |
| 2003/0037850 A1 * | 2/2003 | Helmy | C06D 5/06 149/19.4 |
| 2006/0167180 A1 * | 7/2006 | Plaut | C08F 290/12 525/187 |
| 2013/0277890 A1 * | 10/2013 | Bowman | C08F 2/00 264/496 |

* cited by examiner

*Primary Examiner* — Terressa Boykin
(74) *Attorney, Agent, or Firm* — TraskBritt

(57) ABSTRACT

A precursor formulation of a liner comprising a polymer and at least two curatives. One of the at least two curatives comprises a more reactive curative and the other of the at least two curatives comprises a less reactive curative. The more reactive curative is formulated to crosslink the polymer. A method of lining a rocket motor is also disclosed, as is a rocket motor including the liner.

24 Claims, 3 Drawing Sheets

PRECURSOR FORMULATIONS FOR A LINER, A ROCKET MOTOR INCLUDING THE LINER, AND RELATED METHODS

TECHNICAL FIELD

The present disclosure relates generally to precursor formulations suitable for use as a liner, and to methods of using the precursor formulations as liners in rocket motors. More specifically, the present disclosure relates to precursor formulations that include a polymer and at least two curatives of differing reactivities.

BACKGROUND

Rocket motors are used to propel a variety of types of payloads at high speeds, such as in spacecraft propulsion and missiles. A casing of a conventional rocket motor is made of metal, a composite material, or a combination of metal and composite materials. During use and operation, an insulation protects the casing from thermal effects and erosive effects of particle streams generated by combustion of a propellant. The insulation is attached to an interior surface of the casing and is made from a composition that, upon curing, is capable of enduring high temperature gases and erosive particles produced while the propellant burns. A liner attaches the propellant to the insulation and to any noninsulated interior surface portions of the casing. One surface of the liner is in contact with the propellant and the other surface is in contact with the insulation or the casing. For effective operation of the rocket motor, the liner is securely attached to the insulation and, if applicable, the casing, and the liner and the propellant are securely attached to one another.

Conventional liners include a polymeric binder and a curing agent, such as a curative. Conventional propellants include a fuel, an oxidizer, a polymeric binder, and a curing agent, such as a curative. In order to be compatible with each other, precursor formulations of the liner and the propellant include similar ingredients, except that the liner typically does not include a fuel or an oxidizer. For instance, the liner and the propellant may include the same or a similar polymeric binder in that the polymer of the liner and the propellant may include the same functional group(s). The propellant is formulated to provide, during combustion, thrust for attaining rocket motor propulsion. During fabrication of the rocket motor, the insulation is prepared and secured to the casing. The liner is then prepared, applied to the insulation, and cured at an elevated temperature, which curing process may take up to a few days. The propellant is then prepared, applied to the liner, and cured. Since this process includes multiple process acts, the process is complex, time consuming, and expensive.

The combustion of the propellant generates extreme conditions within the casing. For example, temperatures inside the casing commonly reach 2,760° C. (5,000° F.). These conditions, in combination with a restrictive throat region of a nozzle passageway, create a high degree of gas turbulence within the casing and nozzle. In addition, gases produced during propellant combustion contain high-energy particles that, under a turbulent environment such as encountered in a rocket motor, erode the insulation. If the burning propellant penetrates the insulation and liner, the casing may melt or otherwise be compromised, causing failure of the rocket motor. A large number of rocket motor failures occur due to failure of the attachment between the insulation, the liner, and the propellant. For instance, an isocyanate curative of the propellant is known to diffuse into the liner, producing a soft layer at the liner-propellant interface that is prone to failure. At the time of applying the propellant, a majority of its curative has not reacted with the polymeric binder and, thus, is free to diffuse into the liner. Consequently, if diffusion occurs, the portion of the propellant proximal to the liner is deficient in curative, which produces a weak layer of propellant attached to the liner. Further, if a majority of the curative diffuses into the liner, uncured propellant is next to the liner. Moisture or contamination at any point in the process may also result in a weak attachment between the insulation and the liner or the liner and the propellant.

To compensate for the diffusion of the curative from the propellant and into the liner, an aziridine compound has been incorporated into liner formulations that include hydroxyl terminated polybutadiene (HTPB), carboxyl terminated polybutadiene (CTPB), or butadiene terpolymer (PBAN). The aziridine compound diffuses into the propellant and polymerizes in the presence of ammonium perchlorate to augment the HTPB, CTPB, or PBAN crosslinking. However, the use of the aziridine compound is only effective with liner formulations that include HTPB, CTPB, or PBAN and, thus, is not suitable for use with a broad range of liner and propellant formulation.

Another proposed solution to reduce the diffusion of the curative into the liner has been to use an isocyanate solution, which is applied to a surface of a cured liner or insulation. However, this leaves the isocyanate, a reactive material, exposed to environmental moisture, which can decrease the effectiveness of the isocyanate solution.

It would be desirable to improve the strength and reliability of attachment between the liner and the propellant to produce a more reliable rocket motor.

BRIEF SUMMARY

A precursor formulation of a liner is disclosed. The precursor formulation comprises a polymer and at least two curatives. One of the at least two curatives comprises a more reactive curative and the other of the at least two curatives comprises a less reactive curative.

Also disclosed is a method of lining a rocket motor. The method comprises applying a precursor formulation of a liner to a rocket motor. The precursor formulation comprises a liner polymer and at least two curatives, one of the at least two curatives comprising a more reactive curative and the other of the at least two curatives comprising a less reactive curative.

Also disclosed is a rocket motor comprising a liner, insulation, and a propellant. The liner comprises a reaction product of a liner polymer and a more reactive curative, and a less reactive curative. The propellant comprises a reaction product of a propellant polymer, the less reactive curative, and a propellant curative.

DETAILED DESCRIPTION

Figure 1:
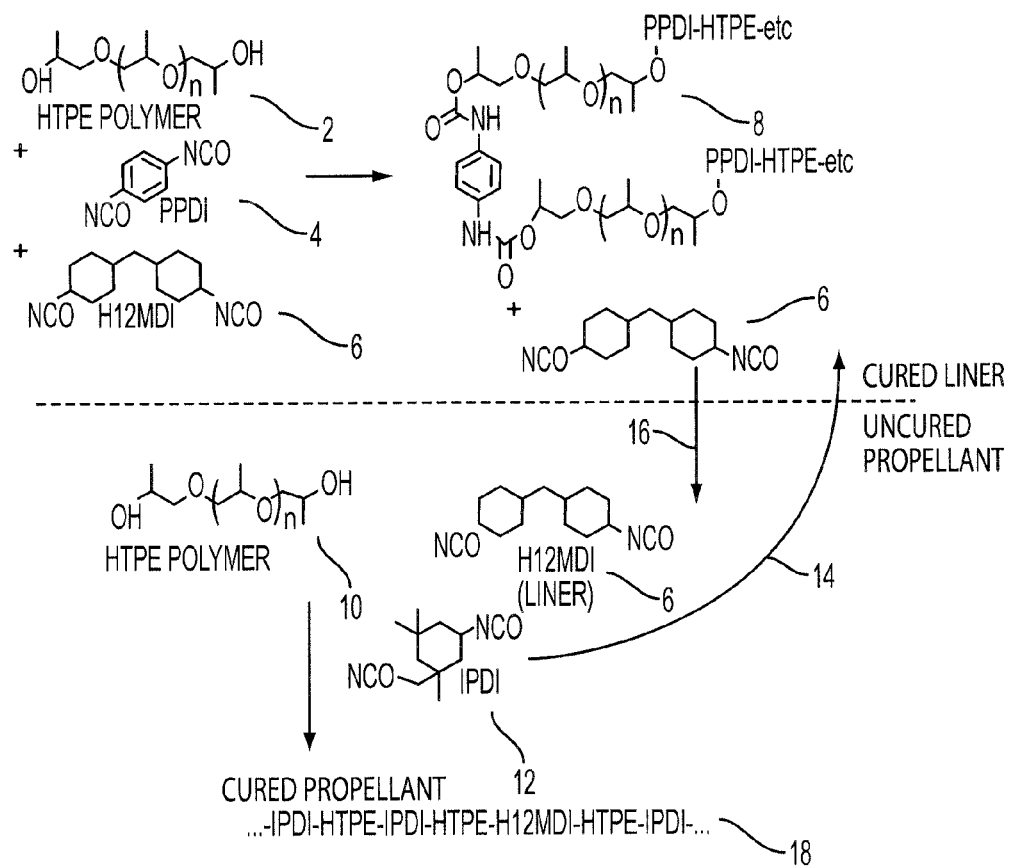
FIG. 1 is a schematic illustrating reaction of the at least two curatives according to an embodiment of the present disclosure.

A precursor formulation for use as a liner is disclosed, as are methods of using the precursor formulation to form a liner in a rocket motor. The precursor formulation of the liner includes a polymer and at least two curatives (e.g., crosslinking agents) having different reactivities. As used herein, the term "precursor formulation" means and includes ingredients of the formulation before the ingredients are reacted (e.g., cured). When the precursor formulation is cured to form the liner, one of the curatives polymerizes the polymer of the precursor formulation of the liner, while the other curative is substantially nonreactive with that polymer. The other curative (e.g., the nonreactive curative) remains available to diffuse into a precursor formulation of a propellant of the rocket motor and crosslink a polymer of the precursor formulation of the propellant.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

The illustrations presented herein are not meant to be actual views of any particular non-lethal device, but are merely idealized representations that are employed to describe the present disclosure. The figures are not necessarily drawn to scale. Additionally, elements common between figures may retain the same numerical designation.

The precursor formulation of the liner includes the polymer and the at least two curatives. For convenience, the polymer in the precursor formulation of the liner may also be referred to herein as the "liner polymer." One of the curatives is more reactive with the liner polymer than the other of the curatives. Thus, the precursor formulation of the liner includes a more reactive curative and a less reactive curative, where the different reactivities are relative to that of the liner polymer. The more reactive curative reacts with, and crosslinks, the liner polymer. Thus, the more reactive curative functions in the precursor formulation of the liner as a primary curative to crosslink the liner polymer during cure of the liner, while the less reactive curative remains substantially unreacted. Since the less reactive curative is unreacted, the less reactive curative remains available for subsequent reactions, such as for polymerizing a polymer in the precursor formulation of the propellant. For convenience, the polymer in the precursor formulation of the propellant may also be referred to herein as the "propellant polymer." Following cure of the liner, the less reactive curative may diffuse into the precursor formulation of the propellant. The less reactive curative may function as a secondary curative to polymerize the propellant polymer.

The more reactive curative may be preferentially reactive with the liner polymer such that the liner polymer is crosslinked by the more reactive curative. Substantially all of the more reactive curative may react with the liner polymer to cure the precursor formulation and form the liner. As used herein, the term "substantially all" means and includes greater than about 95%, such as greater than about 99%. The more reactive curative may be between about 30 times and about 5000 times more reactive than the less reactive curative with the liner polymer, such as between about 100 times and about 1500 times more reactive than the less reactive curative with the liner polymer. In one embodiment, the more reactive curative is about 200 times more reactive with the liner polymer than is the less reactive curative. By utilizing curatives having different reactivities, substantially all of the less reactive curative may be unreacted following cure of the precursor formulation of the liner. Thus, the less reactive curative may be available to diffuse into the precursor formulation of the propellant following cure of the precursor formulation of the liner. While the more reactive curative may be reactive with the propellant polymer, since substantially all of the more reactive curative is used to cure the precursor formulation of the liner, little or none of the more reactive curative is available to react with the propellant polymer following casting of the precursor formulation of the propellant.

The diffusion of the less reactive curative into the precursor formulation of the propellant may occur during and following application of the precursor formulation of the propellant on the liner. The less reactive curative may diffuse into the precursor formulation of the propellant due to the deficiency of its own curative. At the time of applying (e.g., casting) the precursor formulation of the propellant on the liner, the precursor formulation of the propellant includes another curative. For convenience, the another curative may also be referred to herein as the "propellant curative." At the time of casting, the propellant curative has not substantially reacted with the propellant polymer and, thus, is free to diffuse into the liner. The diffusion of the propellant curative into the liner causes the precursor formulation of the propellant to be deficient in its own curative. However, since the liner includes the less reactive curative, the less reactive curative may diffuse from the liner into the precursor formulation of the propellant, assisting with polymerization of the propellant polymer. Thus, the liner may function as a source (e.g., a pool) of additional curative (e.g., the less reactive curative) and may compensate (e.g., correct) for the loss of the propellant curative due to its diffusion into the liner. By providing additional curative to cure the propellant polymer, the crosslink density of the propellant polymer proximal the liner may be increased and the liner and propellant may be securely attached to one another. Thus, the liner-propellant interface may have the desired mechanical properties.

The less reactive curative may be an aliphatic isocyanate, a cycloaliphatic isocyanate, or an aromatic isocyanate, such as isophorone diisocyanate (IPDI), IPDI trimers, dimer diisocyanate (DDI), dicyclohexylmethane-4,4'-diisocyanate (H12MDI), hexamethylene diisocyanate (HDI), HDI trimers, cyclohexyl diisocyanate (CHDI), tetramethyl xylene diisocyanate (TMXDI), or combinations thereof. Such isocyanates are commercially available from numerous sources, such as Evonik Industries AG (Marl, Germany), BASF Corp. (Florham Park, N.J.), Dow Chemical Company (Midland, Mich.), or Bayer MaterialScience AG (Leverkusen, Germany). In one embodiment, the less reactive curative is IPDI trimer. In another embodiment, the less reactive curative is H12MDI. The less reactive curative may be present in the precursor formulation of the liner at a range of from about 0.5% by weight to about 10% by weight, such as from about 1% by weight to about 8% by weight or from about 1% by weight to about 5% by weight.

The more reactive curative may be an aromatic isocyanate, such as methylene diphenyl diisocyanate (MDI), polymeric MDI (pMDI), para-phenylene diisocyanate (PPDI), toluene diisocyanate (TDI), or combinations thereof. Such aromatic isocyanates are commercially available from numerous sources, such as Dow Chemical Company (Midland, Mich.), Bayer MaterialScience AG (Leverkusen, Germany), or Huntsman Corp. (The Woodlands, Tex.). In one embodiment, the more reactive curative is MDI. In another embodiment, the more reactive curative is PPDI. The more reactive curative may be present in the precursor formulation of the liner at an amount sufficient to crosslink the liner polymer. By way of example, the NCO:OH ratio of the more reactive curative: liner polymer may be from about 1 to about 1.5, such as about 1.35.

While various examples herein describe the less reactive and more reactive curatives as isocyanates, other curatives may be used as long as the curatives have different reactivities for the liner polymer.

The liner polymer may be a polymer formulated to be curable by reaction with the more reactive curative. The liner polymer may include hydroxyl functional groups that react with isocyanate groups of the more reactive curative to form urethane crosslinkages. The polymer may be a polyether, a fluorinated polyether, a polyurethane, an epoxy, a polysulfide, a polybutadiene polymer, a polyethylene oxide, or a polyester. By way of example, the liner polymer may be a hydroxyl terminated polybutadiene (HTPB) (e.g., R45M), a hydroxyl terminated polyether (HTPE), a carboxyl terminated polybutadiene (CTPB), or a butadiene terpolymer (PBAN). In one embodiment, the liner polymer is HTPE, such as PLURACOL® 1026, which is a polyether alcohol commercially available from BASF Corp. (Florham Park, N.J.). PLURACOL® 1026 has a nominal functionality of 3, an —OH No. (avg.) of 27, a nominal molecular weight of 6000, and a viscosity of 1320 cps at 25° C. The precursor formulation may include from about 10% by weight to about 85% by weight of the liner polymer, such as from about 30% by weight to about 65% by weight of the liner polymer or from about 40% by weight to about 80% by weight of the liner polymer. The liner polymer may function as a binder for the liner. In another embodiment, the liner polymer is HTPB, such as that commercially available from Cray Valley Hydrocarbon Specialty Chemicals (Exton, Pa.) under the POLY BD® tradename.

Depending on the desired mechanical and physical properties of the liner, the precursor formulation of the liner may optionally include conventional ingredients, such as at least one plasticizer, at least one filler, at least one additive, at least one diluent, at least one antioxidant, at least one catalyst, at least one flame retardant, or combinations thereof. Such ingredients are conventional in the rocket motor liner art and, therefore, are not described in detail herein. The optional ingredients may also be used to facilitate processing of the precursor formulation. Since the precursor formulation of the liner includes both the less reactive curative and the more reactive curative, no aziridine compound is present. In one embodiment, the precursor formulation of the liner includes a filler, such as zinc borate.

The precursor formulation of the liner may be produced by conventional techniques, such as by combining (e.g., mixing) the ingredients. The polymer, less reactive curative, more reactive curative, and any optional ingredients may be combined in any order to produce the precursor formulation of the liner. Methods of applying and curing the precursor formulation of the liner are known in the art and, therefore, are not described in detail herein. Briefly, the ingredients may be combined at a temperature of greater than or equal to about 20° C., and the resulting precursor formulation of the liner applied to a casing of the rocket motor and cured, forming the liner on an interior surface of the casing. While the curing may occur at room temperature (about 20° C.-25° C.), the curing may be accelerated by the application of at least one of heat and pressure as known in the art.

A schematic illustration showing the reaction of liner polymer 2 and more reactive curative 4, followed by diffusion of less reactive curative 6 into the precursor formulation of the propellant is shown in FIG. 1. The precursor formulation of the liner including the liner polymer 2, more reactive curative 4, and less reactive curative 6 may be prepared as previously described. While the liner polymer 2 is illustrated as HTPE, the more reactive curative 4 is illustrated as PPDI, and the less reactive curative 6 is illustrated as H12MDI, other polymers or curatives may be used. Other ingredients (not shown) may be present in the precursor formulation of the liner including fillers, plasticizers, diluents, catalysts, as previously described. The more reactive curative 4 may react with the liner polymer 2 to form a polymerized liner polymer 8, while the less reactive curative 6 remains substantially unreacted in the resulting liner. Upon casting of the precursor formulation of the propellant, which includes a propellant polymer 10 and a propellant curative 12, a portion of the propellant curative 12 may diffuse into the liner, which is indicated by the arrow labeled "14." Other ingredients (not shown) may be present in the precursor formulation of the propellant. While the propellant polymer 10 is illustrated as HTPE and the propellant curative 12 is illustrated as IPDI, other polymers or curatives may be used. The less reactive curative 6 may diffuse from the liner into the precursor formulation of the propellant, which is indicated by the arrow labeled "16." Since the less reactive curative 6 is formulated to react with the propellant polymer 10, the less reactive curative 6 may assist in polymerization of the propellant polymer 10. The less reactive curative 6 may supplement the propellant curative 12 to polymerize the propellant polymer 10 and form a polymerized propellant polymer 18. Thus, the less reactive curative 6 and the propellant curative 12 may be used to polymerize the propellant polymer 10.

The propellant polymer may be the same or a different polymer than is used in the liner polymer. To provide compatibility between the liner and propellant, at least one ingredient, such as the polymer, of the liner and propellant may be similar, such as having the same functional group(s). The propellant may include other conventional ingredients, such as at least one plasticizer, at least one filler, at least one additive, at least one diluent, at least one antioxidant, at least one catalyst, at least one flame retardant, or combinations thereof. Such ingredients are conventional in the rocket motor propellant art and, therefore, are not described in detail herein. The precursor formulation of the propellant may be produced by conventional techniques, such as by combining (e.g., mixing) the ingredients. Methods of applying and curing the precursor formulation of the propellant are known in the art and, therefore, are not described in detail herein. Briefly, the ingredients may be combined at a temperature of greater than or equal to about 25° C., and the resulting precursor formulation of the propellant applied to the liner and cured, forming the propellant over the liner. While the curing may occur at room temperature (about 25° C.), the curing may be accelerated by the application of at least one of heat and pressure as known in the art.

Figure 2:
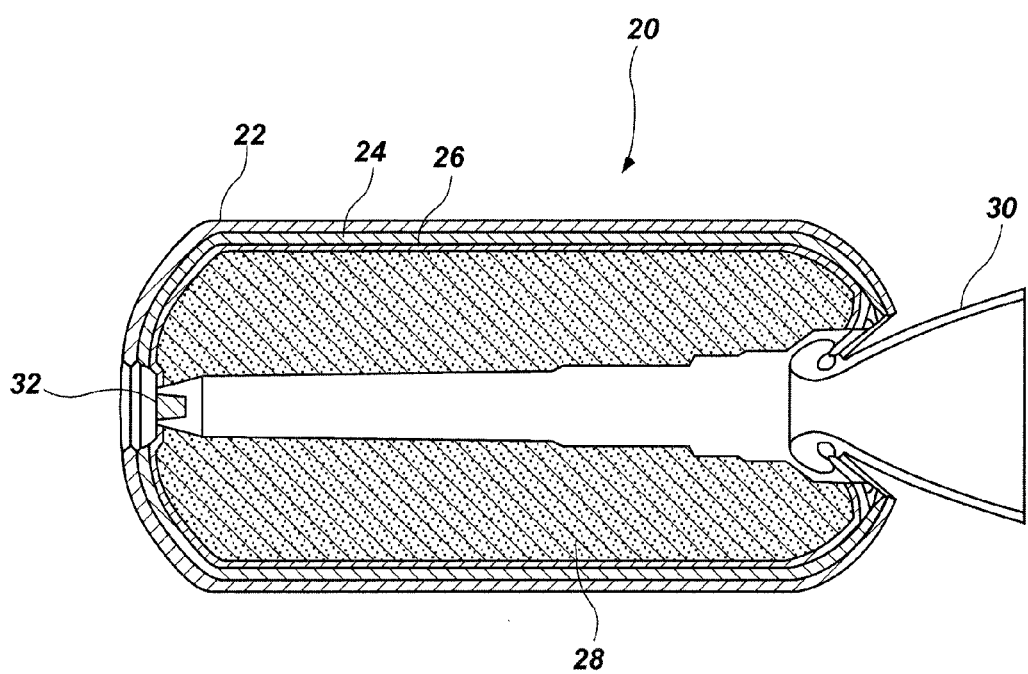
FIG. 2 is a simplified cross-section of a rocket motor including a liner formed from a precursor formulation according to an embodiment of the present disclosure.

The precursor formulation of the liner may be used in a rocket motor 20, which may include casing 22, insulation 24, liner 26, and propellant 28 as shown in FIG. 2. The liner 26 may be formed from an embodiment of the precursor formation having the at least two curatives with different reactivities, as previously described. The rocket motor 20 may also include a nozzle assembly 30, an igniter 32, and other conventional components, which are not illustrated for simplicity and convenience. The liner 26 may include a reaction product (e.g., the polymerized liner polymer 8) of the liner polymer 2 and the more reactive curative 4, while the propellant 28 may include a reaction product (e.g., the polymerized propellant polymer 18) of the propellant polymer 10, the less reactive curative 6, and the propellant curative 12. Both the liner 26 and propellant 28 may also include residual (e.g., trace) amounts of the less reactive curative 6. As used herein, the term "residual" means and includes less than about 1% by weight, such as less than about 0.5% by weight. Residual (e.g., trace) amounts of the more reactive curative 4 may also be present in the liner 26.

Without being bound by any theory, it is believed that by using the two curatives in the precursor formulation of the liner, the less reactive curative may become encased in the polymerized liner polymer following cure of the precursor formulation. By encasing the less reactive curative in a matrix of the liner polymer, the less reactive curative may be protected from environmental conditions during application and cure of the precursor formulation of the propellant. In addition, the shelf life of the resulting liner may be increased. Use of the two curatives in the precursor formulation of the liner also enables a wider range of propellants to be used with the liner.

The following examples serve to explain embodiments of the present disclosure in more detail. These examples are not to be construed as being exhaustive or exclusive as to the scope of this disclosure.

EXAMPLES

Example 1

HTPE and HTPB Precursor Formulations of the Liner

Precursor formulations A-H of the liner were prepared and included the ingredients shown in Table 1. The polymer was HTPE (commercially available from BASF Corp. (Florham Park, N.J.) under the PLURACOL® 1026 tradename) or HTPB (commercially available from Cray Valley Hydrocarbon Specialty Chemicals (Exton, Pa.) under the POLY BD® tradename). The less reactive curative was an IPDI trimer (commercially available from Evonik Industries AG (Marl, Germany) under the VESTANAT® T1890/100 tradename) or H12MDI (commercially available from Evonik Industries AG (Marl, Germany) under the VESTANAT® H12MDI tradename). The more reactive curative was MDI (commercially available from Huntsman Corp. (The Woodlands, Tex.) under the SUPRASEC® 9150 tradename). The precursor formulation of the liner also included zinc borate (ZnB) (commercially available from U.S. Borax Inc. (Greenwood Village, Colo.) under the FIRBRAKE FIREBRAKE® ZB tradename), aluminum trihydroxide (ATH) (commercially available from Huber Engineered Materials (Atlanta, Ga.) under the HYDRAL® 710 tradename), and/or glass microspheres (commercially available from Potters Industries Inc. (Malvern, Pa.) under the SPHERICEL® 110P8 and QCel 6042S tradenames) as mineral fillers.

TABLE 1

Precursor Formulations for the Liner

| Precursor Formulation | Polymer (wt %) | Plasticizer (wt %) | Less reactive curative (wt %) | More reactive curative (wt %) | Mineral Fillers (wt %) |
|---|---|---|---|---|---|
| A | HTPE (25.1) | Triacetin (17.1) | IPDI trimer (1.0) | MDI (2.1) | ZnB (11.7) ATH (29.3) Glass microspheres (13.6) |
| B | HTPE (24.6) | Triacetin (16.8) | IPDI trimer (3.0) | MDI (2.1) | ZnB (11.5) ATH (28.7) Glass microspheres (13.4) |
| C | HTPE (24.1) | Triacetin (16.5) | IPDI trimer (4.8) | MDI (2.0) | ZnB (11.2) ATH (28.1) Glass microspheres (13.1) |
| D | HTPE (24.1) | Triacetin (16.5) | H12MDI (4.8) | MDI (2.0) | ZnB (11.2) ATH (28.1) Glass microspheres (13.1) |
| E | HTPB (38.5) | (0) | IPDI trimer (1.0) | MDI (4.9) | ZnB (11.9) ATH (29.8) Glass microspheres (13.9) |
| F | HTPB (37.7) | (0) | IPDI trimer (3.0) | MDI (4.8) | ZnB (11.7) ATH (29.2) Glass microspheres (13.6) |
| G | HTPB (36.9) | (0) | IPDI trimer (4.9) | MDI (4.7) | ZnB (11.4) ATH (28.6) Glass microspheres (13.3) |
| H | HTPB (37.7) | (0) | H12MDI (3.0) | MDI (4.8) | ZnB (11.7) ATH (29.2) Glass microspheres (13.6) |

Figure 3:
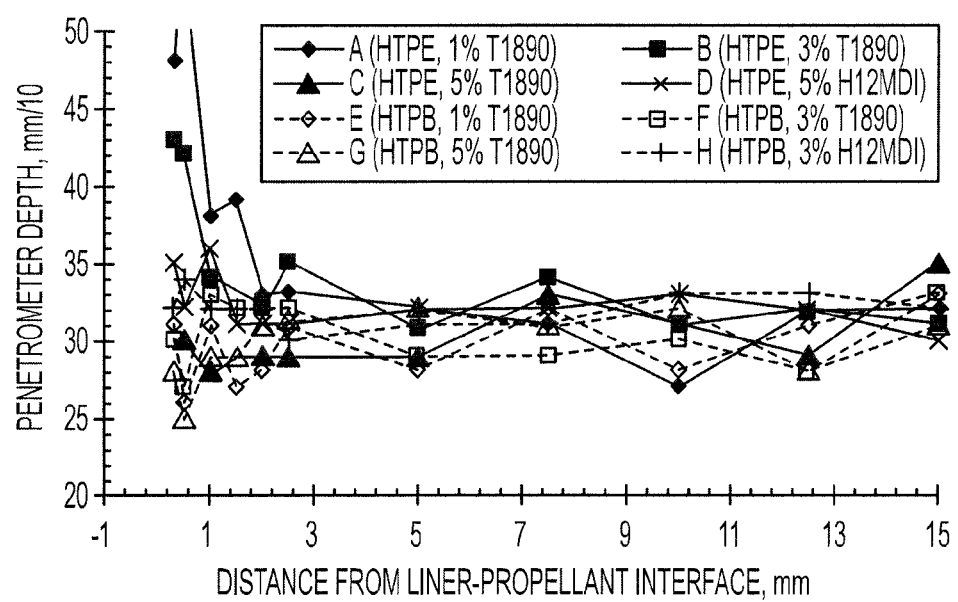
FIG. 3 is a graph illustrating penetrometer testing of precursor formulations of the liner according to embodiments of the present disclosure.

The bond strength of the precursor formulations in Table 1 to an HTPE-based propellant was tested. In addition to HPTE, the HTPE-based propellant included aluminum and ammonium perchlorate, and was cured with isocyanate curatives. After curing the precursor formulations of the liners at 57° C. for 19 hours, the HTPE-based propellant was cast on the liner and cured for a minimum of seven days at 57° C. Penetrometer data was measured at the liner-propellant interface by conventional techniques. Table 2 and FIG. 3 show the effect on the interfacial propellant penetrometer depth-bulk propellant penetrometer depth (ΔP) of the bondline depending on the type of polymer used and on the type and amount of less reactive curative used. Table 2 also includes mechanical test results, showing that the precursor formulations of the liner created excellent bondlines with the HTPE propellant when the less reactive curative was present at an appropriate amount.

TABLE 2

Results of Liner Formulation

| Precursor Formulation | Less reactive curative | Amount of Less reactive curative | ΔP | AFT Max Stress (psi) | 90-degree Peel (pli) |
|---|---|---|---|---|---|
| A | IPDI trimer | 1% | +20 | N/T | N/T |
| B | IPDI trimer | 3% | +10 | 50.8 | 1.6 |

TABLE 2-continued

Results of Liner Formulation

| Precursor Formulation | Less reactive curative | Amount of Less reactive curative | ΔP | AFT Max Stress (psi) | 90-degree Peel (pli) |
|---|---|---|---|---|---|
| C | IPDI trimer | 5% | −1 | 82.1 | 3.9 |
| D | H12MDI | 5% | +2 | 81.1 | 4 |
| E | IPDI trimer | 1% | −2 | 136 | 6.2 |
| F | IPDI trimer | 3% | −2 | 125 | 4.6 |
| G | IPDI trimer | 5% | −4 | 116 | 3.6 |
| H | H12MDI | 5% | +1 | 73.9 | 2.3 |

N/T = not tested

As shown by the results in Table 2 and as suggested by FIG. 3, the bond strength between the liner and propellant was stronger when the liner polymer was HTPB rather than HTPE. Also, when the liner polymer was HTPE, the liner was more sensitive to the concentration of less reactive curative than when the liner polymer was HTPB. For both the HTPE-containing liner and the HTPB-containing liner, the IPDI trimer appeared to be more effective than the H12MDI as the less reactive curative.

Example 2

Additional Precursor Formulations of the Liner

Additional precursor formulations of the liner are prepared in which the IPDI trimer or H12MDI used in Example 1 is replaced with IPDI, DDI, TMXDI, HDI, or HDI trimers, and the MDI is replaced with pMDI, PPDI, or TDI. The precursor formulations of the liner are bonded to the HTPE-based propellant as described in Example 1. The bond strengths between the liner and propellant are comparable to those of Example 1.

While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the following appended claims and their legal equivalents.

What is claimed is:

1. A precursor formulation of a liner, comprising:
a polymer; and
at least two curatives, one of the at least two curatives comprising a more reactive curative formulated to polymerize the polymer and the other of the at least two curatives comprising a less reactive curative formulated to be unreactive with the polymer.

2. A method of lining a rocket motor, comprising:
applying a precursor formulation of a liner to a rocket motor, the precursor formulation of the liner comprising:
a liner polymer and at least two curatives, one of the at least two curatives comprising a more reactive curative formulated to polymerize the liner polymer and the other of the at least two curatives comprising a less reactive curative formulated to be unreactive with the liner polymer;
reacting the liner polymer with the more reactive curative to form the liner;
applying a precursor formulation of a propellant to the liner; and
reacting a propellant polymer of the precursor formulation of the propellant with the less reactive curative of the precursor formulation of the liner.

3. The precursor formulation of claim 1, wherein the less reactive curative comprises an aliphatic isocyanate or a cycloaliphatic isocyanate.

4. The precursor formulation of claim 1, wherein the less reactive curative comprises isophorone diisocyanate (IPDI), IPDI trimers, dimer diisocyanate (DDI), dicyclohexyl-methane-4,4'-diisocyanate (H12MDI), hexamethylene diisocyanate (HDI), HDI trimers, cyclohexyl diisocyanate (CHDI), tetramethyl xylene diisocyanate (TMXDI), or combinations thereof.

5. The precursor formulation of claim 1, wherein the more reactive curative comprises an aromatic isocyanate.

6. The precursor formulation of claim 1, wherein the more reactive curative comprises methylene diphenyl diisocyanate (MDI), polymeric MDI (pMDI), para-phenylene diisocyanate (PPDI), toluene diisocyanate (TDI), or combinations thereof.

7. The precursor formulation of claim 1, wherein the less reactive curative comprises from about 0.5% by weight to about 10% by weight of the precursor formulation.

8. The precursor formulation of claim 1, wherein the less reactive curative comprises from about 1% by weight to about 8% by weight of the precursor formulation.

9. The precursor formulation of claim 1, wherein the less reactive curative comprises from about 1% by weight to about 5% by weight of the precursor formulation.

10. The precursor formulation of claim 1, wherein the polymer comprises a hydroxyl terminated polybutadiene (HTPB), a hydroxyl terminated polyether (HTPE), a carboxyl terminated polybutadiene (CTPB), or a butadiene terpolymer (PBAN).

11. The precursor formulation of claim 1, wherein the polymer comprises HTPE, the more reactive curative comprises PPDI, and the less reactive curative comprises H12MDI.

12. The precursor formulation of claim 1, wherein the polymer comprises HTPE, the more reactive curative comprises MDI, and the less reactive curative comprises IPDI trimer.

13. The precursor formulation of claim 1, wherein the polymer comprises HTPE, the more reactive curative comprises MDI, and the less reactive curative comprises H12MDI.

14. The precursor formulation of claim 1, wherein the polymer comprises HTPB, the more reactive curative comprises MDI, and the less reactive curative comprises IPDI trimer.

15. The precursor formulation of claim 1, wherein the polymer comprises HTPB, the more reactive curative comprises MDI, and the less reactive curative comprises H12MDI.

16. The method of claim 2, wherein reacting the liner polymer with the more reactive curative comprises reacting the liner polymer with the more reactive curative, the more reactive curative being between about 50 times and about 300 times more reactive with the polymer than the less reactive curative.

17. The method of claim 2, wherein reacting the liner polymer with the more reactive curative comprises polymerizing the liner polymer.

18. The method of claim 17, wherein polymerizing the liner polymer comprises reacting the liner polymer with the more reactive curative without reacting the liner polymer with the less reactive curative.

19. The method of claim 2, wherein reacting the liner polymer with the more reactive curative comprises encasing the less reactive curative in the liner.

20. The method of claim 2, wherein reacting a propellant polymer of the precursor formulation of the propellant with the less reactive curative comprises forming a propellant attached to the liner.

21. A rocket motor comprising:
 a liner on an insulation of a rocket motor, the liner comprising:
  a reaction product of a liner polymer and a more reactive curative, the more reactive curative formulated to polymerize the liner polymer; and
  a less reactive curative formulated to be unreactive with the liner polymer; and
 a propellant on the liner, the propellant comprising:
  a reaction product of a propellant polymer, the less reactive curative, and a propellant curative.

22. The rocket motor of claim 21, wherein the liner further comprises a residual amount of the propellant curative.

23. The rocket motor of claim 21, wherein the propellant further comprises a residual amount of the less reactive curative.

24. A precursor formulation of a liner, comprising:
 a polymer comprising a polyether, a fluorinated polyether, a polyurethane, an epoxy, a polysulfide, a polybutadiene polymer, a polyethylene oxide, or a polyester;
 a more reactive curative formulated to polymerize the polymer and comprising methylene diphenyl diisocyanate (MDI), polymeric MDI (pMDI), para-phenylene diisocyanate (PPDI), toluene diisocyanate (TDI), or combinations thereof; and
 a less reactive curative formulated to be unreactive with the polymer and comprising isophorone diisocyanate (IPDI), IPDI trimers, dimer diisocyanate (DDI), dicyclohexylmethane-4,4'-diisocyanate (H12MDI), hexamethylene diisocyanate (HDI), HDI trimers, cyclohexyl diisocyanate (CHDI), tetramethyl xylene diisocyanate (TMXDI), or combinations thereof.

* * * * *